Feb. 2, 1954 A. G. BEASLEY 2,667,798
BICYCLE FORK STRAIGHTENING TOOL
Filed July 28, 1951

*Allen G. Beasley*
INVENTOR.

BY
*Glenn L. Fish*
Atty.

Patented Feb. 2, 1954

2,667,798

UNITED STATES PATENT OFFICE 2,667,798

BICYCLE FORK STRAIGHTENING TOOL

Allen G. Beasley, Spokane, Wash., assignor to Charley W. Beasley, Spokane, Wash.

Application July 28, 1951, Serial No. 239,140

2 Claims. (Cl. 81—15)

This invention relates to tools of the class used for bending pipes, tubes or rods.

One object of the invention lies in the provision of a tool particularly adapted for straightening and truing the forks of bicycles.

Another object of the invention lies in the provision of a tool adapted to be positioned on one prong of a bicycle fork with its head bearing against a bend in the prong and having a loop or ring longitudinally movable over the tool's shaft or shank, within the confines of a keeper, and provided to be positioned in encircling relation to the fork prong and tool shank for a fulcrum when straightening the bend in the prong.

Another object in the invention lies in the provision of a bicycle fork straightening tool which has a groove in the face on its head and adapted to receive the fork prong and prevent its slipping from the head.

Another object of the invention lies in the provision of a right angle handle formed on the bicycle fork straightening tool shank to prevent twisting of the shank during a straightening operation.

Another object of the invention lies in forming the shank of the tool in segments or sections which may be disassembled and thus permit the tool to be stored in a comparatively small space.

Another object of the invention lies in the provision of a bicycle fork straightening tool which is inexpensive to manufacture and which is easy to use.

Figure 1:
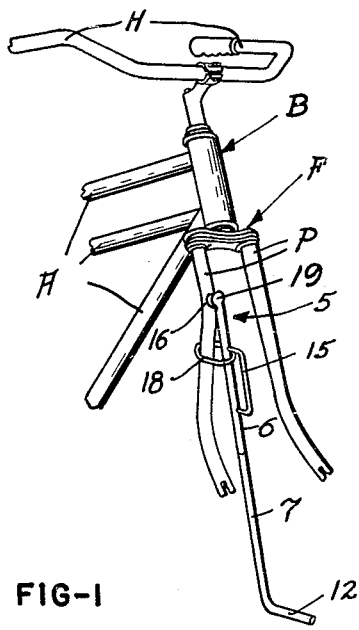
Figure 2:
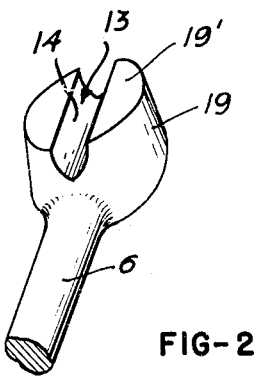
Figure 4:
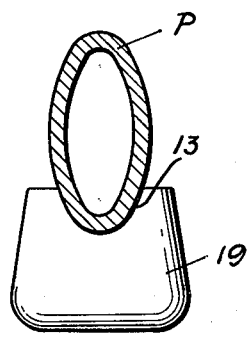
Figure 3:
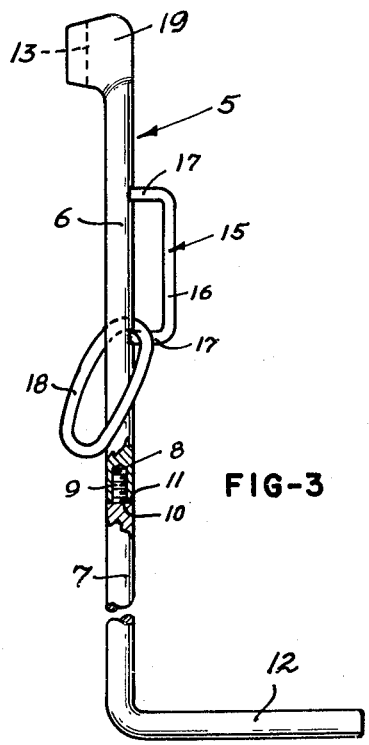

In the accompanying drawings, forming a part of this specification, and in which like numerals are employed to designate like parts, Figure 1 is a fragmentary perspective view of a bicycle having one prong of the front fork bent and with my tool applied for straightening the bend, Figure 2 is a perspective view of the head, forming a part of my tool, Figure 3 is a side elevation of the improved tool with portions broken away for convenience of illustration, and, Figure 4 is a transverse cross section through one prong of a fork and with the head applied thereto and shown in plan.

Figure 1 illustrates how the tool may be applied to a bent prong of a bicycle with the tool indicated in general by the numeral 5 and F indicates the front fork of the bicycle B having the usual handle bars H and frame braces A.

My improved tool as shown in the drawing comprises a shank having upper and lower sections 6 and 7. The lower end of section 6 is provided with an internally threaded socket 8 and the upper end of section 7 is provided with an externally threaded reduced end portion 9 which is adapted to thread into the socket 8 and secure the shank sections together with the shoulder 10 of the lower section bearing against the annular lower end face 11 of section 6. The threads are of such depth and pitch so that when the shoulder 10 is seated on face 11, the angular handle 12 is disposed in alignment with relation to the vertical plane common to groove 13 and section 6. Groove 13 is formed with a substantially arcuate inner face 14 which extends vertically of the side face 19' of head 19 in offset axial alignment with section 6.

A keeper 15 is secured to the shank section 6 as by welding, and comprises a spaced parallel rod 16 terminating at each end with right angle portions 17 spaced one above the other and in parallel relation with each other. A metal loop or ring 18 is provided in encircling relation to section 6 and within the confines of the keeper portions 17.

One prong P of the fork is shown to be bent at 16 and to effect straightening of the bend, my tool is applied to the prong by placing the groove 13 of the head 19 on the convex side face of the bend in alignment with the vertical plane of the bend and with ring 18 encircling the prong P in downwardly spaced relation to head 19. Shank 7 and handle 12 are grasped, and with the fork secured against movement, pull is exerted upon the tool in the direction indicated by the free end of handle 12, and the prong straightened to its original shape. The tool may be shifted along the prong to effectively apply pressure to the necessary areas for straightening and truing the fork.

Ring 18 is vertically adjustable to permit selective positioning of the fulcrum with relation to the pressure bearing head as found most suitable for the particular job at hand.

Having thus described my invention, I claim:

1. A tool comprising a shank, a handle extending at right angles to and on the lower end of said shank, a fulcrum ring loosely encircling said shank, a fixed head on the upper end of said shank, said head extending at right angles to said shank and in a direction opposite to that of the handle, and a vertically disposed groove having an arcuate cross section in the face of said head and extending parallel to said shank, said groove, shank and handle being aligned in a vertical plane.

2. A bicycle fork straightening tool comprising a shank having separable upper and lower sections releasably secured together in axial alignment, a handle disposed at right angle to and on the outer end of said lower section, a keeper on said upper section substantially midway its length and disposed to extend therefrom in the direction and in the plane of said handle, a relatively large fulcrum ring loosely encircling said upper section and within the confines of said keeper, an enlarged head carried by the upper section on its outer end and integral therewith said head extending at right angles to the shank and in a direction opposite to that of the handle, a face on said head having its plane disposed at right angle to the axis of said handle, and a groove having an arcuate inner face in said face and extending in offset parallel relation to said shank.

ALLEN G. BEASLEY.

References Cited in the file of this patent

UNITED STATES PATENTS

| Number | Name | Date |
|---|---|---|
| 871,052 | Wallace | Nov. 12, 1907 |
| 2,191,720 | Meinhardt | Feb. 27, 1940 |
| 2,302,279 | Waller | Nov. 17, 1942 |